(12) United States Patent
Martinelli et al.

(10) Patent No.: US 9,010,474 B2
(45) Date of Patent: Apr. 21, 2015

(54) "HUBLESS" SELF-BALANCING HUMAN TRANSPORTER

(75) Inventors: Pascal Marie Christian Yves Martinelli, Arcueil (FR); Alexis Louis Williams, Fontenay le Fleury (FR); Olivier François Larive, Noiseau (FR); Nicolas René Coibion, Faremoutiers (FR)

(73) Assignee: Universite Paris-SUD 11, Orsay Cedex (FR)

( * ) Notice: Subject to any disclaimer, the term of this patent is extended or adjusted under 35 U.S.C. 154(b) by 0 days.

(21) Appl. No.: 14/123,335

(22) PCT Filed: Jun. 4, 2012

(86) PCT No.: PCT/EP2012/060478
§ 371 (c)(1),
(2), (4) Date: Jan. 30, 2014

(87) PCT Pub. No.: WO2012/171821
PCT Pub. Date: Dec. 20, 2012

(65) Prior Publication Data
US 2014/0131126 A1    May 15, 2014

(30) Foreign Application Priority Data
Jun. 17, 2011   (FR) ...................................... 11 55334

(51) Int. Cl.
*B62K 3/00*   (2006.01)
*B62D 51/02*   (2006.01)

(52) U.S. Cl.
CPC ................ *B62K 3/007* (2013.01); *B62D 51/02* (2013.01)

(58) Field of Classification Search
CPC ......... B62K 3/007; B62D 51/02; B62D 61/00
USPC ....................................................... 180/218
See application file for complete search history.

(56) References Cited

U.S. PATENT DOCUMENTS

| | | | |
|---|---|---|---|
| 6,079,724 A | 6/2000 | Lin | |
| D551,592 S | 9/2007 | Chang et al. | |
| 7,717,200 B2 * | 5/2010 | Kakinuma et al. | 180/6.5 |
| 7,962,256 B2 * | 6/2011 | Stevens et al. | 701/22 |
| 8,172,017 B2 * | 5/2012 | Ren | 180/65.21 |
| 8,562,387 B1 * | 10/2013 | Henthorne | 446/431 |
| 2002/0011368 A1 * | 1/2002 | Berg | 180/218 |
| 2004/0129464 A1 * | 7/2004 | Arling et al. | 180/7.1 |
| 2011/0067937 A1 | 3/2011 | Gomi et al. | |

FOREIGN PATENT DOCUMENTS

| | | |
|---|---|---|
| EP | 2 213 564 A1 | 8/2010 |
| GB | 2506726 A  * | 4/2014 |
| WO | 2007/128124 A1 | 11/2007 |

* cited by examiner

*Primary Examiner* — Kevin Hurley
(74) *Attorney, Agent, or Firm* — Sughrue Mion, PLLC

(57) ABSTRACT

The invention relates to a self-balancing human transporter comprising a platform (1) flanked by two wheels (10) and equipped with a holding and driving stick (7) and a gyroscopic stabilization device acting on motors (14) that drive the wheels, each of the wheels comprising a rim (12) which collaborates with bearings (7) borne by respective crescent-shaped mounts (5) each of which extends essentially facing the associated rim and which support the associated drive motor so that this motor drives the corresponding wheel by acting on the rim, the mounts being fixed to the sides of the platform.

5 Claims, 3 Drawing Sheets

"HUBLESS" SELF-BALANCING HUMAN TRANSPORTER

The invention relates to a self-balancing human transporter, or gyropod, that is very simple to manufacture.

BACKGROUND OF THE INVENTION

The most well known self-balancing human transporter is marketed under the trade name "segway". Such a self-balancing human transporter comprises a platform on which the user stands upright. The platform is equipped with two wheels flanking it at the sides. The self-balancing human transporter is equipped with a handle for holding and steering and with a gyroscopic stabilizing device acting on motors that drive the wheels.

These gyropods have a high number of component parts and are expensive to produce. In particular, the wheels are each mounted on the output shaft of a reduction gearbox attached to the platform and the input shaft of which is driven by the associated drive motor. This arrangement is complicated and expensive to produce.

More recently, a self-balancing human transporter of simpler design has been proposed and marketed under the name "ewee". This transporter has a slender central body forming the handle, and bearing two wheels at its lower end. The body comprises half-platforms extending one on either side of the body, outboard of the wheels, to take the feet of the user.

This arrangement appears to be less ergonomic because the separated arrangement of the half-platforms forces the user to stand with his feet apart and leads to a vehicle of greater transverse width.

OBJECT OF THE INVENTION

The object of the invention is a gyropod with a centralized platform, and of simplified design.

SUMMARY OF THE INVENTION

With a view to achieving this objective, there is proposed a self-balancing human transporter comprising a platform flanked by two wheels and equipped with a handle for holding and steering, and with a gyroscopic stabilizing device acting on motors that drive the wheels. According to the invention, each of the wheels comprises a rim which collaborates with bearings borne by respective crescent-shaped supports which each extend essentially facing the associated rim and which bear the associated drive motor such that this motor drives the corresponding wheel by acting on the rim, the supports being fixed to the sides of the platform.

Thus, each drive motor can collaborate directly (by friction or by meshing) with the rim of the associated wheel, this naturally offering a high reduction ratio, saving the expense of a reduction gearbox.

According to a preferred embodiment, each of the motors has a shaft equipped with a roller which collaborates with an annular zone of the rim so that the weight borne by the platform is transmitted to the wheels via the rollers.

Thus, the roller can collaborate with an internal runway attached to the annular zone of the rim, so that the wheel is driven in its rotation by the friction between this runway and the roller. As the weight of the platform passes essentially through the rollers, this then ensures that the power of the motor is transmitted to and the wheels.

For preference, the platform comprises a footplate borne by crossmembers which extend between the supports being fixed thereto. This arrangement is very simple to produce and to assemble and also proves to be very rigid. Further, this arrangement allows the center of gravity of the self-balancing human transporter to be lowered.

BRIEF DESCRIPTION OF THE DRAWINGS

The invention will be better understood in the light of the following description of one particular nonlimiting embodiment of the invention, with reference to the figures of the attached drawings in which.

DETAILED DESCRIPTION OF THE INVENTION

Figure 1:
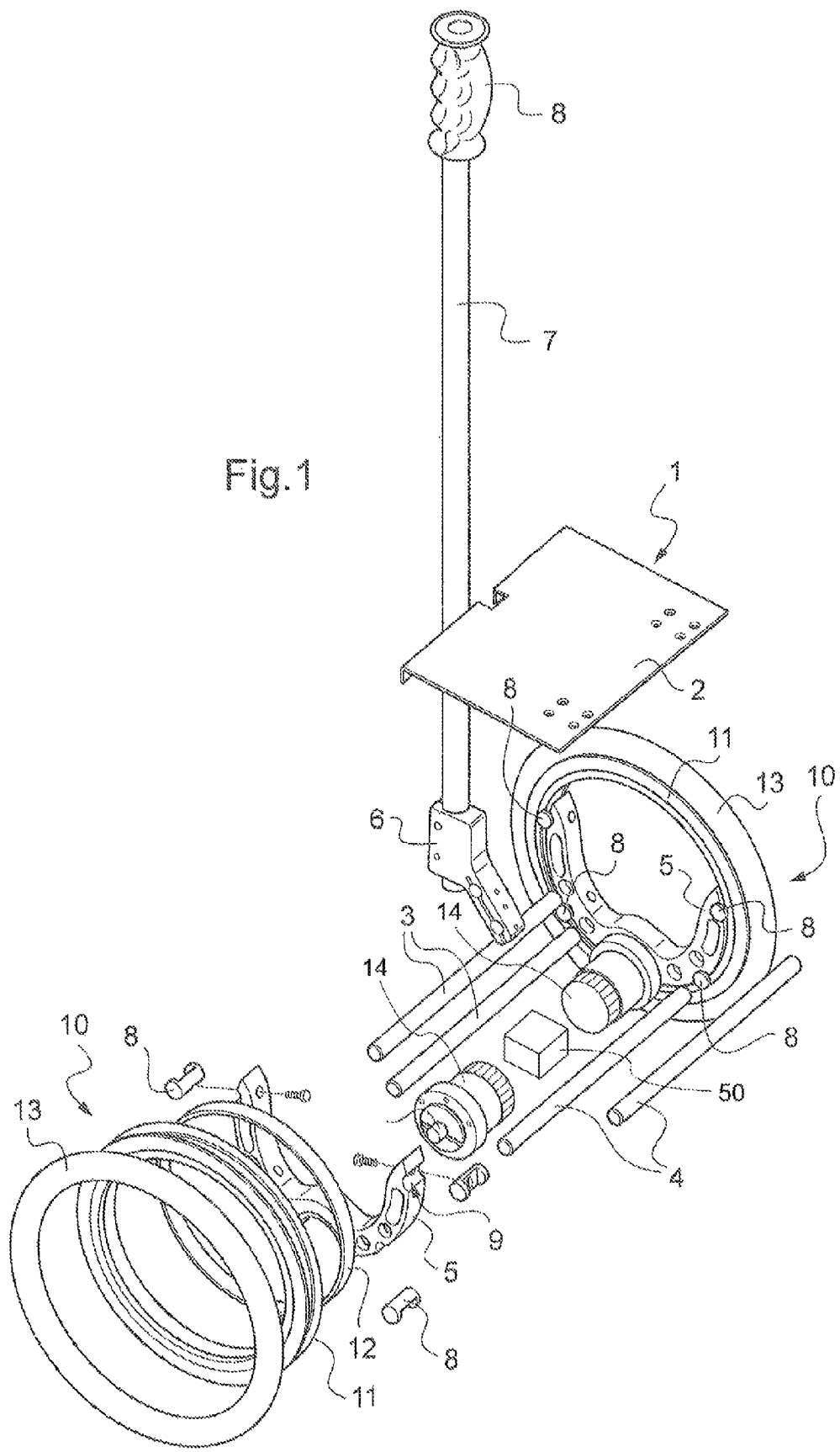
FIG. 1 is an exploded view of a self-balancing human transporter according to the invention.
Figure 2:
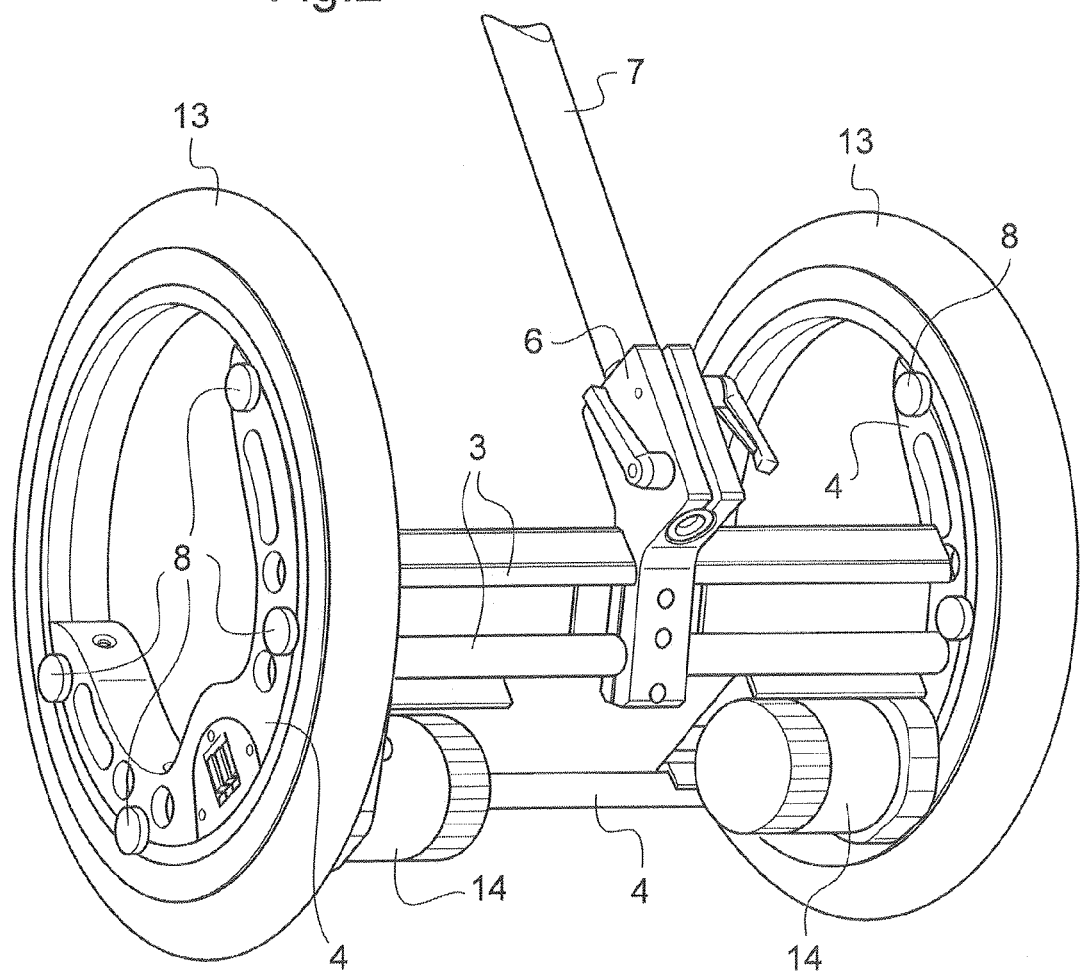
FIG. 2 is a perspective view of the self-balancing human transporter of FIG. 1, showing the underneath thereof.

With reference to the figures, the self-balancing human transporter of the invention comprises a platform 1 comprising a footplate 2. The footplate 2 rests on a structure comprising two rear crossmembers 3 and two front crossmembers 4 which extend between crescent-shaped supports 5 by being fixed via their ends (for example as a push-fit, into these supports). The rear crossmembers 3 bear an anchorage 6 designed to take a holding and steering handle 7 ending in a hand grip 8. The assembly formed by the crossmembers 3, 4 and the supports 5 forms a rigid structure. In particular, the anchorage 6 may be provided to be clamped onto the two rear crossmembers 3, as this greatly limits the twisting of the structure.

Figure 3:
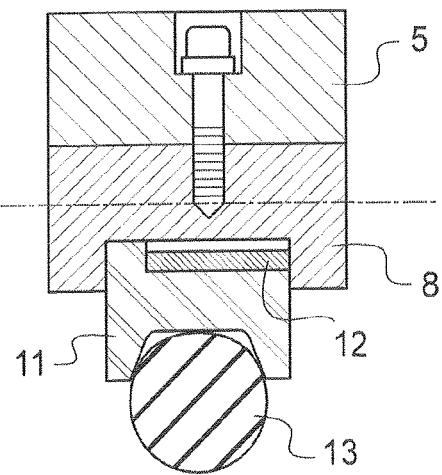
FIG. 3 is a view in cross section of one of the wheels, in the region of one of the bearings of the associated support.
Figure 4:
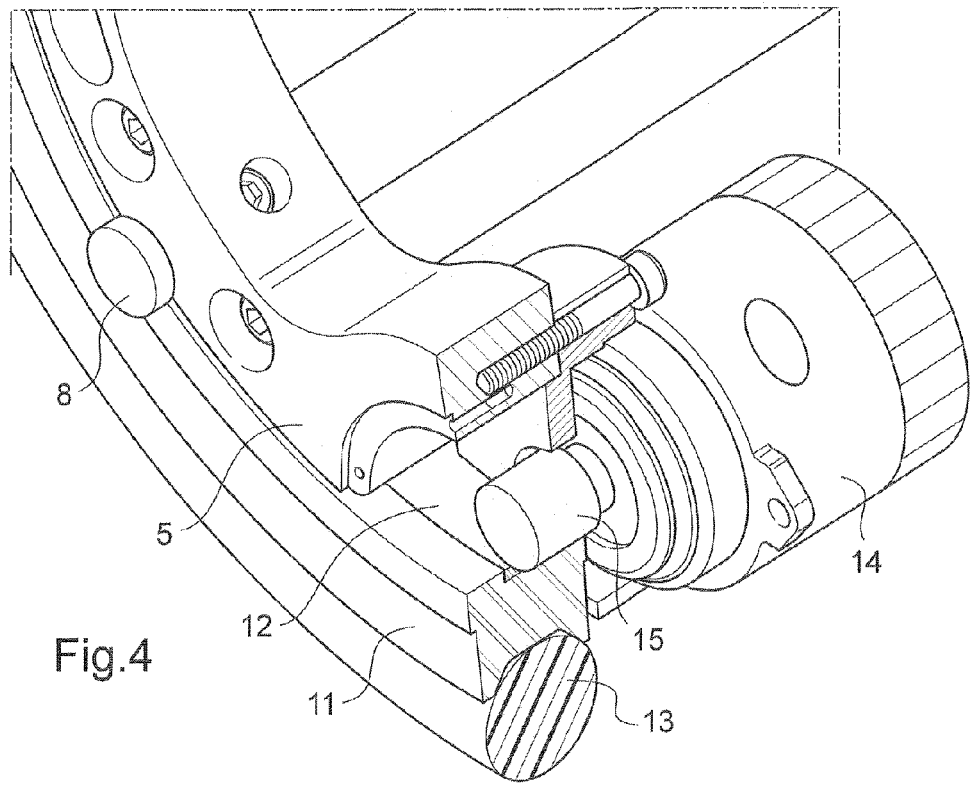
FIG. 4 is a perspective view with partial section of a wheel in the region of the friction roller.
Figure 5:
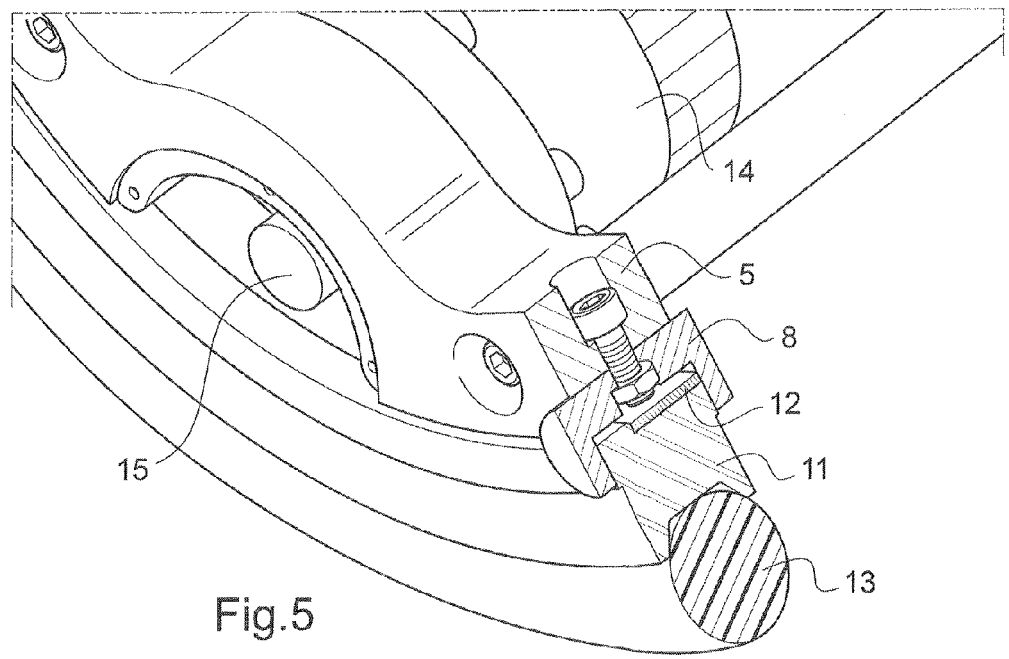
FIG. 5 is a perspective view with partial section of a wheel in the region of one of the bearings.

The wheels 10 each comprise a rim 11 externally bearing a running member 13 (for example a pneumatic tire or a solid elastomer tire) and internally bear a runway 12 (for example an elastomer strip) which in this instance is housed in an internal path in the rim, as illustrated in FIG. 3.

Each of the wheels 10 is attached to the corresponding support 5 in such a way that the runway 12 extends facing an external face of the support 5. This support is in the overall shape of a crescent and bears four bearings, in this instance plain bearings 8 which project from the external face of the associated support 5 in order here to collaborate with the internal face of the rim and its sides in order to guide it in rotation on the support 5. The bearings may, for example, be made of polyamide.

As is more particularly visible in FIG. 3, the plain bearings 8 are here of cylindrical overall shape and have a front face cut to form a stirrup that straddles the internal face of the rim 11, and a semicylindrical rear face able to be housed in one of the correspondingly shaped housings 9 of the support 5.

In order to mount the wheel 10 on the associated support 5 all that is required is for the bearings 8 to be offered up to the internal face of the rim 11, for the support 5 to be slid into the wheel in an axial direction thereof so that the four bearings 8 enter their housings 9. The bearings 8 are then fixed to the support 5 using screws, as illustrated in FIG. 1.

The rotational drive of the wheels is achieved by motors 14 borne by the supports 5. The motors 14 each comprise an output shaft bearing a roller 15 collaborating directly by friction with the runway 12. The reduction ratio is naturally high, avoiding any need for a reduction gearbox.

Most of the weight of the platform 1 and of the passenger is transmitted to the wheels 10 via the rollers 15, thus ensuring that the latter press against the runway 12 firmly enough to be able to guarantee good transmission of the power from the motor. Thus, all of the radial load is transmitted by the motors to the wheels, without the use of a device for pressing the roller against the rim.

Finally, the self-balancing human transporter comprises electronics 50 for controlling the motors and stabilizing the self-balancing human transporter (which are preferably arranged between the motors), as well as a battery pack (preferably located in the region of the front crossmembers 4).

The assembly thus formed is very simple and comprises a reduced number of component parts. The only component parts that are a little complex (at least in terms of shape) are the supports 5. Thus the invention is entirely suited to the production of low-cost indoor self-balancing human transporters.

The invention is not restricted to what has just been described but on the contrary encompasses any alternative form that falls within the scope defined by the claims. In particular, although in this instance the bearings are plain bearings, they could be bearings of any other type, for example rolling bearings.

Although in this instance the motors comprise a friction roller collaborating directly with the runway 12, it is possible to conceive of any other mode of drive, for example a pinion fixed at the end of the motor shaft collaborating with a gearwheel borne by the wheel. A member would then need to be provided to transmit the weight of the platform and of the user to the wheels for example a simple roller rolling on the rim and coaxial with the pinion.

Further, although the gyroscopic stabilizing device is carried under the footplate, it could be incorporated into the handle 7 or even into the supports 5.

The invention claimed is:

1. A self-balancing human transporter comprising a platform (1) flanked by two wheels (10) and equipped with a handle (7) for holding and steering, and with a gyroscopic stabilizing device (50) acting on motors (14) that drive the wheels, characterized in that each of the wheels comprises a rim (12) which collaborates with bearings (8) borne by respective crescent-shaped supports (5) which each extend essentially facing the associated rim and which bear the associated drive motor such that this motor drives the corresponding wheel by acting on the rim, the supports being fixed to the sides of the platform.

2. The self-balancing human transporter as claimed in claim 1, in which the platform comprises a footplate (2) borne by crossmembers (3, 4) which extend between the supports (5) being fixed thereto.

3. The self-balancing human transporter as claimed in claim 1, in which each drive motor drives the associated wheel via a friction roller (15) collaborating with a runway (12) attached to the rim of the wheel.

4. The self-balancing human transporter as claimed in claim 3, in which the weight of the platform and of the use is transferred to the wheels essentially via the friction rollers (15) of the motors.

5. The self-balancing human transporter as claimed in claim 1, in which the rim guide bearings (8) are plain bearings.

* * * * *